April 14, 1936.　　　A. WALDMANN　　　2,037,291
LAUNDRY CART
Filed March 12, 1935　　2 Sheets-Sheet 1

Inventor
Anne Waldmann.
By F. Dittmar
Attorney

April 14, 1936.　　　A. WALDMANN　　　2,037,291
LAUNDRY CART
Filed March 12, 1935　　2 Sheets-Sheet 2
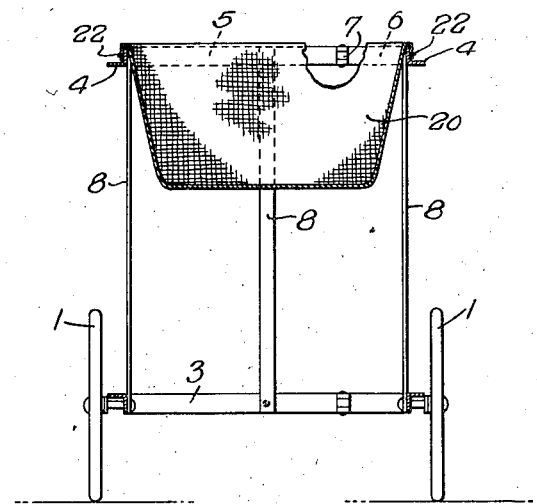
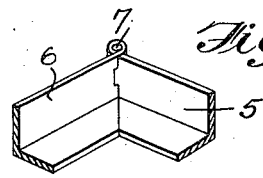
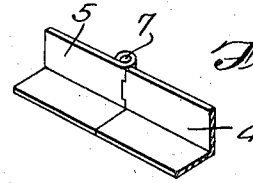
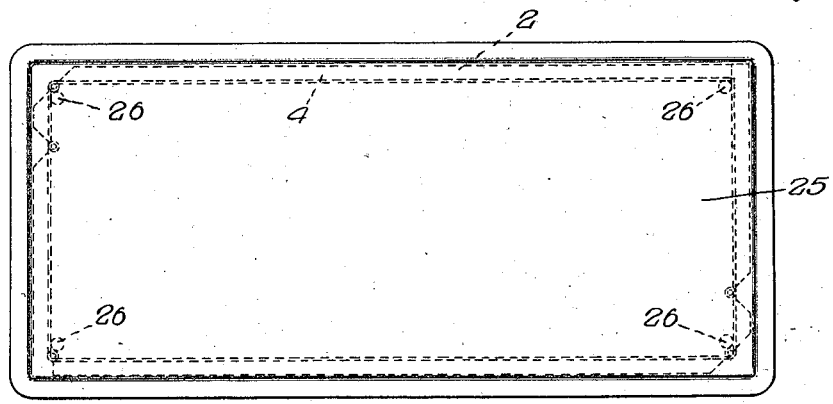
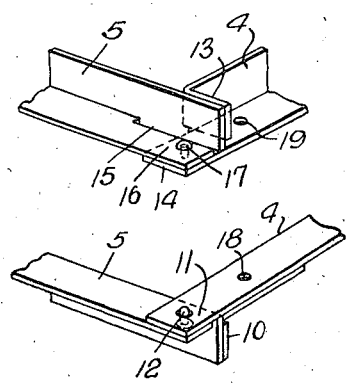
Inventor
Anne Waldmann
By F. Dittmar
Attorney Patented Apr. 14, 1936

2,037,291

UNITED STATES PATENT OFFICE 2,037,291

LAUNDRY CART

Anne Waldmann, Waukegan, Ill.

Application March 12, 1935, Serial No. 10,707

2 Claims. (Cl. 280—36)

This invention relates to a laundry cart and one object of the invention is to provide a conveyance of this character in which clothes to be hung upon a clothes line may be easily transported from a laundry to the line together with pins for securing the clothes upon the line.

Another object of the invention is to so construct the cart that its frame may be firmly secured in either a set up or collapsed condition and when collapsed reduced to a compact mass which may be stored in a small space.

Another object of the invention is to provide a collapsible clothes cart which will be light in weight and easily handled but very strong and not liable to be distorted or broken when set up and in use.

Another object of the invention is the provision of a clothes cart having a clothes and pin container which is detachable from the frame and can be washed and kept clean and sanitary.

Another object of the invention is to provide the cart with a top which when applied to the frame will permit use of the conveyance as a tea cart or portable serving table.

Another object of the invention is to provide a clothes cart having a frame formed of angle metal which is strong and durable and very cheap to manufacture.

The invention is illustrated in the accompanying drawings wherein:

Fig. 3 is a sectional view taken transversely through the clothes cart.

Fig. 4 is a fragmentary perspective view of a corner of the frame.

Fig. 5 is a top plan view showing a table top applied to the frame instead of the fabric clothes container.

Fig. 7 is a fragmentary perspective view of a corner of the folded frame.

Fig. 8 is a fragmentary perspective view of an intermediate portion of the folded frame.

Figure 1:
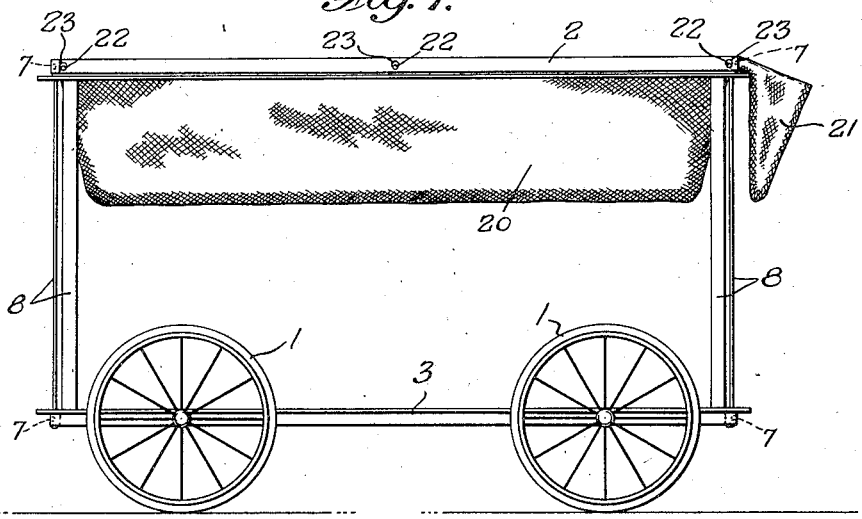
Fig. 1 is a view showing the improved clothes cart in side elevation.
Figure 2:
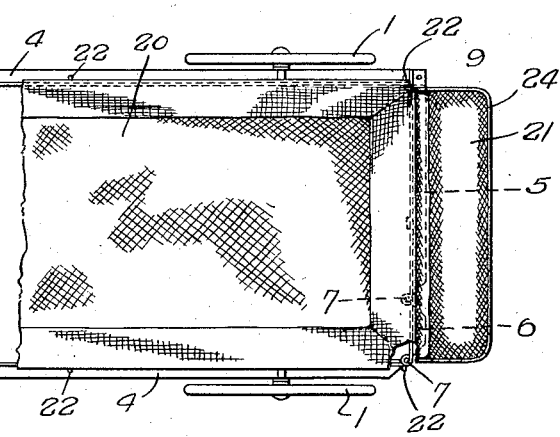
Fig. 2 is a top plan view showing the clothes container partially broken away.

This improved clothes cart consists of a carriage having wheels 1 projecting downwardly from the frame to movably support the cart and permit it to be readily transported from one place to another. The carriage has upper and lower frames 2 and 3 each of which has side rails 4 formed of strips of angle metal and end rails formed from strips of angle metal 5 and 6. The strips of angle metal have their vertical flanges hinged to each other as shown at 7 in order that the carriage may be set up for use as shown in Figures 1 and 2 or folded and reduced to the collapsed condition shown in Figure 6 for storage. Struts 8 extend vertically between the frames 2 and 3 to retain them in spaced relation to each other and have their ends firmly secured to vertical flanges of the angle strips from which the frames are formed. It should be noted that ends of the horizontal flanges of the strips 6 and adjacent ends of the horizontal flanges of strips 4 and 5 are cut at an incline so that these inclined edges will contact and form bevelled corners when the carriage is in its folded condition. The wheels have stub axles fixed to the vertical flanges of the side strips 4 and are disposed externally of the carriage when the cart is in use and between the side rails in alinement with each other when the cart is collapsed. By this arrangement the folded cart can be set close to a wall when not in use where it will take up a small amount of room and since the wheels are in alinement it can be easily rolled from one place to another.

Figure 6:
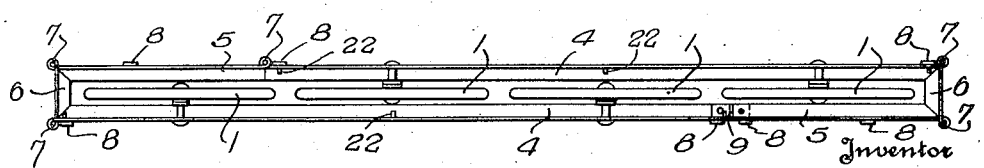
Fig. 6 is a top plan view showing the frame collapsed.

Adjoining end and side rails are to be releasably connected in order to secure the frames in either the set up or collapsed condition and in order to do so there has been provided joints illustrated in detail in Figure 4. This joint 9 is at one corner of a frame as shown in Figure 2 when the carriage is in position for use and intermediate the length of the frame when the carriage is collapsed as shown in Figure 6. Referring to Figure 4 wherein the joint is shown connecting ends of the rails 4 and 5 when the carriage is in the set up position it will be seen that the lower frame has the free end of the vertical flange of the rail 5 split from the horizontal flange and bent to form a side tongue 10 beyond which projects a tongue 11 formed by the extended end of the horizontal flange. This tongue 11 overlaps the end of the horizontal flange of the rail 4 and is formed with an opening through which engages a pin 12 projecting upwardly from the rail 4. The rail 5 of the upper frame is also split from its end and bent to form a side tongue 13 and end tongue 14 and this tongue 14 is overlapped by the free end of the rail 4 of the upper frame. A slit 15 forms a resilient tongue 16 of the free end portion of the horizontal flange of the rail 4 and therefore this tongue may be sprung upwardly into overlapping relation to the tongue 14 and the pin 17 carried by the tongue 16 and projecting downwardly therefrom engaged through an opening formed in the flange 14. This causes a binding action to take place between the overlapping flanges of the side and end rails of the upper and lower frames and a firm joint provided. The tongues 10 and 13 serve to retain the side and end rails at right angles to each other and hold the carriage in a rectangular shape when set up for use. Openings 18 and 19 are provided to receive the pins 12 and 17 when the carriage is collapsed and rails 4 and 5 disposed longitudinally of each other.

The clothes container 20 and pin holder or pocket 21 are formed of strong fabric and walls of the container converge downwardly as shown in Figures 2 and 3 in order that this container may be easily set in place through the upper frame and have its marginal portions engaged over upper edges of vertical flanges of side and end rails of this frame and studs or buttons 22 projecting from these flanges engaged through button holes 23 formed in marginal portions of the container walls to securely but releasably secure the container in place. The holder or pocket 21 for clothes pins is preferably formed integral with one end of the clothes container and projects from one end of the carriage. A metal frame or binding 24 is preferably provided for the upper edges of walls of the pocket in order to hold it open and permit clothes pins to be easily removed or dropped into the pocket.

When this cart is in use the carriage is set up in an operative position and the clothes container and pin receiving pocket attached to the upper frame. Clothes pins are placed in the pocket and clothes which have been washed and are ready to hang upon a line placed in the container 20. The cart is then wheeled over to a clothes line and moved along beneath the line as the clothes are hung up. A sheet, spread or other large and relatively heavy article may be allowed to rest in the container as it is attached to the line and thus eliminate likelihood of the heavy article slipping out of a person's hands and dropping upon the ground as it is being hung upon a line. The clothes may also be dropped into the container as they are removed from the line thus making it unnecessary to carry them and clothes pins will not be liable to drop upon the ground and become soiled or lost as they will be dropped into the pocket as they are removed. After being used the container and pocket may be removed and the carriage folded as shown in Figure 6 and set upon a shelf or against a wall where it will be out of the way or the device can be left assembled. Since the container and pocket are detachable from the carriage and are formed of fabric they can be washed when soiled and thus kept clean and sanitary.

Instead of being employed as a clothes cart this device may be used as a tea cart or portable serving table in which case the top 25 shown in Figure 5 will be used in place of the container and pocket. This top 25 may be formed of wood or metal although it is preferably metal and is bent along its margins to form depending rims or flanges which fit about the upper frame of the carriage. Pins 26 which extend downwardly from corner portions of the top engage in corners of the upper frame as indicated by dotted lines in Figure 5 and serve to prevent the top from slipping out of its proper position upon the carriage when in use. When the carriage is collapsed and put away the cover may be set within the same where it will rest upon the wheels and be held in place by the upper frame and struts. I have therefore provided a device which can be used either as a clothes cart or as a serving table or tea cart.

It will be found that the cart will provide comfort in its use, and will eliminate stooping over when used as a laundry cart, serving table or tea cart.

Having thus described my invention what is claimed is:—

1. A conveyance comprising a foldable carriage open at its top and having upper and lower frames formed of hinge-connected members, struts extending between and secured to said frames, wheels carried by the lower frame members at the sides of the carriage, the frames being releasably united to form a joint at one corner of the carriage whereby said frames may be swung about their hinges to transform the carriage from a set up position for use with the wheels disposed outwardly of the carriage at opposite sides thereof to a collapsed position in which the wheels are disposed within the folded frame.

2. A conveyance comprising a foldable carriage open at its top and having upper and lower frames and struts extending between and secured to said frames, the frames having side and end bars of angle metal hinged to each other and the end bars being formed of hinged sections, wheels having stub axles carried by the side bars of the lower frame and projecting outwardly when the carriage is set up for use, certain of the side and end bars having their ends overlapped and releasably connected to form joints at a corner of the carriage whereby the carriage may be reversed and folded into a compact mass with the wheels disposed entirely within the frame.

ANNE WALDMANN.